(12) United States Patent
Verhaeghe et al.

(10) Patent No.: US 11,089,734 B2
(45) Date of Patent: Aug. 17, 2021

(54) RECTANGULAR BALER WITH IMPROVED BALING CONTROL SYSTEM AND CONTROL METHOD

(71) Applicant: CNH Industrial America LLC, New Holland, PA (US)

(72) Inventors: Didier Verhaeghe, Ypres (BE); Kenny Nona, Kessel-Lo (BE); Brecht Vermeulen, Gullegem (BE); Robert Mikulandric, Heverlee (BE)

(73) Assignee: CNH Industrial America LLC, New Holland, PA (US)

( * ) Notice: Subject to any disclaimer, the term of this patent is extended or adjusted under 35 U.S.C. 154(b) by 677 days.

(21) Appl. No.: 15/599,424

(22) Filed: May 18, 2017

(65) Prior Publication Data

US 2017/0332557 A1    Nov. 23, 2017

(30) Foreign Application Priority Data

May 18, 2016   (BE) .................................. 2016/5344

(51) Int. Cl.
*A01F 15/08*    (2006.01)
*B30B 9/30*     (2006.01)
*A01F 15/04*    (2006.01)

(52) U.S. Cl.
CPC ........ *A01F 15/0825* (2013.01); *A01F 15/042* (2013.01); *B30B 9/3007* (2013.01); *B30B 9/3025* (2013.01)

(58) Field of Classification Search
CPC ........ A01F 15/02; A01F 15/04; A01F 15/042; A01F 15/046; A01F 15/08;
(Continued)

(56) References Cited

U.S. PATENT DOCUMENTS 4,624,180 A * 11/1986 Strosser .............. A01F 15/0825
100/191
6,026,741 A * 2/2000 Lippens .............. A01F 15/0825
100/191

(Continued)

FOREIGN PATENT DOCUMENTS

WO    WO-2015014625 A1 *  2/2015

*Primary Examiner* — Shelley M Self
*Assistant Examiner* — Katie L. Parr
(74) *Attorney, Agent, or Firm* — Peter Zacharias; Patrick Sheldrake

(57) ABSTRACT

A rectangular baler including a bale chamber having a plurality of walls including a movable wall section, an actuator for exerting a pressure on the movable wall section, a plunger for compressing crop material, and a control system configured to control the plunger to perform cyclic plunger strokes such that in each stroke the plunger force (F) exerted by the plunger on the crop material increases to reach a maximum plunger force (Fmax) to compress a newly inserted slice of crop material. The control system includes a first module to measure, at consecutive moments during a plunger stroke, a plurality of first values for the plunger force exerted by the plunger and/or for the pressure (Pd) in the actuator; and a control module to control at least one baling setting influencing the compressing of the crop material in the bale chamber as a function of the plurality of first values.

20 Claims, 9 Drawing Sheets

(58) Field of Classification Search
CPC .............. A01F 15/0825; A01F 15/0841; A01F 2015/048; B30B 9/30; B30B 9/3003; B30B 9/3007; B30B 9/3032; B30B 9/3025; B30B 15/16; B30B 15/161; B30B 15/22
USPC ...................... 100/43, 50, 52, 179, 191, 192
See application file for complete search history.

(56) References Cited

U.S. PATENT DOCUMENTS

| | | | | |
|---|---|---|---|---|
| 6,101,932 | A * | 8/2000 | Wilkens | .............. A01F 15/0825 100/192 |
| 6,457,405 | B1 * | 10/2002 | Lippens | .............. A01F 15/0825 100/192 |
| 2003/0049147 | A1 * | 3/2003 | Hinzpeter | ............... B30B 15/22 419/1 |
| 2014/0202343 | A1 | 7/2014 | Van Amstel et al. | |
| 2015/0025757 | A1 * | 1/2015 | Dumarey | .............. A01F 15/046 701/50 |
| 2016/0120129 | A1 | 5/2016 | Verhaeghe et al. | |

* cited by examiner under the plunger force (F) exerted by the plunger on the crop material refers to the force exerted on the plunger by the crop material in the chamber. This force may be measured using a load cell or may be determined in other ways well known to the skilled person, e.g. using a strain gauge.

RECTANGULAR BALER WITH IMPROVED BALING CONTROL SYSTEM AND CONTROL METHOD

FIELD OF THE INVENTION

The field of the invention relates to a rectangular baler with a control system, and in particular to a rectangular baler comprising a bale chamber including a movable wall section, an actuator for exerting a pressure on the movable wall section, a plunger, and a control system for controlling the baling in the bale chamber. The invention also relates to a control method for a rectangular baler and to a computer program product for performing one or more steps of the control method.

BACKGROUND OF THE INVENTION

Prior art rectangular balers have a density control system which is typically done by regulating the pressure in the density belt. In such embodiments the pressure (and thus the force) on the bale chamber door(s), i.e. on the moveable wall section is controlled. In a typical prior art embodiment two hydraulic cylinders are used as actuators for controlling the top door and the side doors, respectively. The relation between the pressure exerted on the top doors and the side doors may be more or less fixed, wherein a system of balancing levers may be used to split the forces over the side and top doors.

US2014/0202343 discloses a haler includes a baling chamber that includes a hale-forming channel including at least one adjustable friction control element, a plunger mounted within the channel, and a rotary drive mechanism for driving reciprocating movement of the plunger. A control system controls operation of the haler. The control system is configured to determine an actual maximum torque value associated with the rotary drive mechanism, to compare the actual maximum torque value with a selected desired maximum torque value, and to adjust the friction control element to regulate the actual maximum torque value according to the desired maximum torque value.

However, in such prior art balers, the one or more actuators are set with a fixed pressure during consecutive active strokes of the plunger. Further, some prior art balers set the pressure of the one or more actuators in function of the desired maximum force occurring on the plunger. The actual force on the plunger may be measured with a load cell and the maximum actual force may be extracted for every active stroke. A moving average of this measured characteristic is being used as input for the bale chamber control system to adjust the pressure of the one or more actuators.

In prior art systems, the general idea has been that the higher the pressure set for the one or more actuators, the higher the plunger force needed to push the crop material through the bale chamber, the higher the density increase.

SUMMARY OF THE INVENTION

The object of embodiments of the invention is to provide an improved control system and control method for a rectangular baler, and in particular a control system and method for a rectangular baler allowing reaching the same bale density with a reduced amount of energy compared to prior art balers.

According to a first aspect there is provided a rectangular baler comprising a bale chamber delimited by a plurality of walls including a movable wall section, an actuator for exerting a pressure on the movable wall section which in its turn exerts a pressure on crop material in the bale chamber, a plunger for compressing crop material in the bale chamber, and a control system. The control system is configured to control the plunger to perform cyclic plunger strokes such that in each stroke the plunger force exerted by the plunger on the crop material increases to reach a maximum plunger force (Fmax) to compress a newly inserted slice of crop material. The control system comprises a first module and a control module. The first module is configured to measure, during a plunger stroke at consecutive moments in time, a plurality of first values for the pressure (Pd) in the actuator and/or for the plunger force (F) exerted by the plunger. The control module is configured to control at least one baling setting influencing the compressing of the crop material in the bale chamber in function of the plurality of first values. The plurality of first values characterizes at least a phase of said plunger stroke before the plunger force reaches the maximum plunger force.

Embodiments of the invention are based inter alia on the inventive insight that within a single active stroke of the plunger various phases can be distinguished. Whilst in a first part of a plunger stroke energy is typically used effectively, this is not the case in a second part thereof where the crop material is recompressed and the bale is moved. The plurality of first values is characteristic for the various phases within a single active stroke. By controlling at least one baling setting in function of the plurality of first values, recompression of expanded material can be reduced and/or the bale can be moved more energy-efficiently. Since typically the final bale density increases more when holding the crop than when re-compressing it, a large portion of the energy which, in prior art balers, is typically invested into re-compressing the material, can be saved. Also, the energy used for moving the bale may be reduced, because as soon as the bale starts moving, the amount of extra deformation can be limited.

In the context of the present invention the term "first values for the pressure (Pd) in the actuator" refers to values representative for the pressure (Pd) in the actuator. Instead of measuring the pressure Pd in the actuator, other values representative for this pressure Pd, such as the force (Fd) exerted by the one or more moveable doors on the crop material, or the force exerted by the one or more actuators on the connection between the one or more actuators and the one or more doors, etc., may be measured. Similarly, in the context of the present invention the term "first values for the plunger force (F)" refers to values representative for the plunger force (F), e.g. the pressure (P) exerted by the plunger on the crop material.

In a preferred embodiment the control system further comprises a second module configured to measure, during the plunger stroke at said consecutive moments in time, a plurality of second values for the position of the plunger and/or for the movement of a bale in the bale chamber and/or for the time. The control module may then be configured to control at least one baling setting in function of the plurality of first values and the plurality of second values. The second values serve as a reference for the first values, and will facilitate the controlling. However, a skilled person will realize that measuring of the second values is not strictly required. The first values may be measured e.g. periodically, and information about the various phases of the plunger stroke can be derived from the first values alone, and can be used to control at least one baling setting. However, by measuring the first and second values a more accurate control will be possible. The skilled person understands that instead of measuring second values representing directly the time, the position, or the movement, a value correlated with the time, the position or the movement may be measured, such as e.g. the angular position of the crank arm which is directly correlated with the position of the plunger.

In an exemplary embodiment the at least one baling setting comprises any one or more of the following settings: a pressure (Ps) set by a controller in the actuator, a driving speed of the baler, a setting for controlling an expansion limiting device configured for limiting the expansion of crop material in the bale chamber, such as a haydog or a clamp or a star wheel. In a preferred embodiment the control module is configured to control the actuator in function of the plurality of first values and the plurality of second values. However, in addition or alternatively the driving speed of the baler and/or control of an expansion limiting device may be adjusted. Even without controlling the actuator this may result in a significant energy reduction. When the driving speed of the baler is increased, there will be collected more crop material in the bale chamber per stroke, moving the at least one moveable wall section outwardly. Hence, by adjusting the driving speed, the various phases within a plunger stroke are influenced, and by suitable controlling of the speed in function of the first and second values, the recompression of expanded material may be reduced and/or the bale may be moved more energy-efficiently. Similar considerations apply when controlling an expansion limiting device in function of the plurality of first values and the plurality of second values.

In an exemplary embodiment the control module is configured to control the at least one baling setting such that energy consumed in a phase in which the plunger has started compressing not only a newly inserted slice of crop material but also previously inserted crop material and/or in a phase in which previously inserted crop material starts moving in the bale chamber is limited.

In a preferred embodiment the pressure (Ps) set in the actuator is controlled such that energy consumed in a phase in which the plunger has started compressing not only a newly inserted slice of crop material but also previously inserted crop material and/or in a phase in which previously inserted crop material starts moving in the bale chamber is minimized or reduced. In other words, by using characteristic points of the plunger load curve in the baler, via the first and second values, the control system is able to adjust the pressure in the actuator so that a significant amount of energy may be saved whilst achieving the same or similar density increase of the crop material in the bale chamber compared to prior art systems.

In an exemplary embodiment the first and second measurement module may optionally be integrated as a single measurement module.

In a measured curve plotting the plurality of first values in function of the plurality of second values, typically three phases of the active stroke, i.e. the forward stroke of plunger, may be distinguished. In a first phase the newly inserted crop in the bale chamber is being compressed against the already compressed and optionally partially expanded crop in the bale chamber. The moment the newly added material reaches a density similar to the density of the crop material already present in the bale chamber, a second phase starts in which the plunger starts compressing all the crop material. During the second phase the plunger force F still increases but at a slower rate than in the first phase. In a third phase, the crop material starts moving. The plunger load profile characterizes both the material that is being compressed and the operating conditions. Where the initial part of the plunger's load-position curve determines the material's compressibility and also relates to the amount of material inserted into the chamber (feed rate), the second part (the second and third phase) of the curve characterizes the baling process itself. This second part characterizes the balance between the friction forces, material compressibility and the position of the moveable section. By using this curve, i.e. the measured first and second values, the baling process may be optimized. Indeed, the controlling of the at least one baling setting may be such that the energy for the second phase and partly the third phase is reduced, as this energy is used for recompression of the crop material and for moving the bale against the friction with the doors. Since typically the final bale density increases more when holding the crop than when re-compressing it, a large portion of the energy which is invested in prior art solutions into re-compressing the material can be saved. In embodiments of the invention, the material is preferably allowed to undergo creep or relaxation to increase its density, rather then using energy for recompressing. Also, the energy used for moving the bale may be reduced. This will also result in an energy saving, because as soon as the bale starts moving, the amount of extra deformation is limited. Further, the peak forces can be reduced since less force is required for similar densities. In embodiments of the invention the idea is to minimize the distance and/or time between the beginning of the second phase and the rear dead point of the plunger by adjusting at least one baling setting, and in particular the pressure (Ps) set in the actuator. In that manner, the baling energy needed to achieve the same or similar density increase compared to prior art balers, may be significantly reduced.

In an exemplary embodiment the control module is configured to control the at least one baling setting such that the pressure on the moveable wall section at a position where the first values start to increase at a slower rate in function of the second values (i.e. a position corresponding with a flexure point), is controlled.

In an exemplary embodiment the control module is configured to control the pressure (Ps) set in the actuator within a single plunger stroke of said cyclic plunger strokes. For example, the control module may be configured to control the actuator such that the pressure on the moveable wall section is decreased when a point is reached where the first values increase at a slower rate in function of the second values. After this point recompression takes place, and by decreasing the pressure on the moveable wall section energy can be saved.

In an exemplary embodiment the first module comprises a load measurement cell configured for measuring a load on the plunger. In an exemplary embodiment the second module comprises a distance measurement sensor configured for measuring a position on the plunger.

In an exemplary embodiment the rectangular baler comprises a movable top door, at least one movable side door, and at least two actuators for exerting a pressure on the moveable top door and on the at least one moveable side door, wherein the control module is configured to control the at least two actuators in function of the plurality of first values. In an exemplary embodiment thereof the control module is configured to control, and preferably decrease, the pressure exerted by the actuator on the top door and the force on the at least one side door in a phase of a plunger stroke before reaching the maximum plunger force.

According to a second aspect there is provided a control method for controlling the compressing of crop material in a rectangular baler comprising a bale chamber delimited by a plurality of walls including a movable wall section, an actuator for exerting a pressure on the movable wall section, a plunger for compressing crop material in the bale chamber. The control method comprises: controlling the plunger to perform cyclic plunger strokes, such that in each stroke the plunger force exerted by the plunger on the crop material increases to reach a maximum plunger force (Fmax) to compress a newly inserted slice of crop material; measuring, at consecutive moments during a plunger stroke, a plurality of first values for the plunger force exerted by the plunger and/or for the pressure exerted by the actuator; and controlling at least one baling setting influencing the compressing of the crop material in the bale chamber in function of the plurality of first values. The plurality of first values characterizes at least a phase of said plunger stroke before the plunger force reaches the maximum plunger force.

In a preferred embodiment, the method further comprises registering, at said consecutive moments during the plunger stroke, a plurality of second values for the position of the plunger and/or for the movement of a bale in the bale chamber and/or for the time. The controlling of the at least one baling setting may then be performed in function of the plurality of first and second values.

In an exemplary embodiment the at least one baling setting comprises any one or more of the following settings: a set pressure (Ps) in the actuator, a driving speed of the baler, a setting for controlling an expansion limiting device configured for limiting the expansion of crop material in the bale chamber, such as a haydog, a clamp or a star wheel. In the example of a haydog, e.g. the protruding distance over which the haydog protrudes in the baling chamber may be controlled. Haydogs are disclosed in US2013/0255512 in the name of the Applicant, the content of which is included herein by reference. In the example of a star wheel, e.g. the braking of the star wheel may be controlled.

In an exemplary embodiment the controlling of the at least one baling setting comprises controlling the set pressure (Ps) in the actuator in function of the plurality of first values and the plurality of second values.

In an exemplary embodiment the controlling of the at least one baling setting comprises controlling said at least one baling setting such that energy consumed in a phase when the plunger is compressing not only a newly inserted slice of crop material but also a previously inserted crop material and/or in a phase when the previously inserted crop material starts moving in the bale chamber, is limited.

In an exemplary embodiment the controlling of the at least one baling setting comprises controlling said at least one baling setting such that the pressure (Pd) in the actuator in a position where the first values start to increase at a slower rate in function of the second values, is controlled.

In an exemplary embodiment the controlling of the at least one baling setting comprises controlling said at least one baling setting such that a measure for the surface area below a curve obtained when plotting the plurality of first values in function of the plurality of second values, is limited.

In an exemplary embodiment the controlling of the at least one baling setting comprises controlling the set pressure (Ps) in the actuator within a single plunger stroke of said cyclic plunger strokes, at least in a phase of the plunger stroke preceding the reaching of the maximum plunger force. For example, the controlling of the actuator may comprise controlling the set pressure (Ps) in the actuator at least in a phase when the plunger is compressing not only a newly inserted slice of crop material but also a previously inserted crop material and/or when the previously inserted crop material starts moving in the bale chamber.

According to a further aspect of the invention, there is provided a computer program comprising computer-executable instructions to perform the method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

According to yet another aspect of the invention there is provided a baler and a method according to any one of the following clauses:

A rectangular baler comprising a bale chamber (15) delimited by a plurality of walls (70, 80) including a movable wall section (70), an actuator (71; 71a, 71b) for exerting a pressure on the movable wall section, a plunger (18) for compressing crop material in the bale chamber (15), and a control system configured to control the plunger (18) to perform cyclic plunger strokes such that in each stroke the plunger force exerted by the plunger on the crop material increases to reach a maximum plunger force (Fmax) to compress a newly inserted slice of crop material, said baler further comprising:

a first module (1001) configured to measure, during a plunger stroke at consecutive moments in time, a plurality of first values for the pressure (Pd) in the actuator and/or for the plunger force exerted by the plunger;

a determining module (1003) configured to determine at least one bale property characterizing the bale that is being formed in the bale chamber in function of the plurality of first values;

wherein said plurality of first values characterize at least a phase of said plunger stroke before the plunger force reaches the maximum plunger force.

The rectangular baler of clause 1, further comprising a second module (1002) configured to measure, during the plunger stroke at said consecutive moments in time, a plurality of second values for the position of the plunger and/or for the movement of a bale in the bale chamber and/or for the time; wherein the determining module (1003) is further configured to determine the at least one bale property in function of the plurality of second values.

The rectangular baler of clause 1 or 2, wherein the at least one bale property comprises any one or more of the following properties: a measure for the feed rate expressing the amount of crop material that is being fed into the bale chamber during said plunger stroke, a slice thickness of a slice of crop material that is being formed during said plunger stroke.

The rectangular baler of clause 3, wherein the determining module is configured to determine the feed rate based on first values measured during a first quarter of the plunger stroke.

The rectangular baler of clause 4, wherein the determining module is configured to determine the feed rate based on a rate at which the first values increase.

The rectangular baler of clause 3, wherein the determining module is configured to determine the slice thickness based on the location of a flexure point where the first values of the plunger force start to increase at a slower rate; and/or based on the location of a point in time (210") when the pressure in the actuator starts to increase above a predetermined pressure value.

The rectangular baler of any one of the previous clauses, wherein the first module comprises a load measurement cell configured for measuring a load on the plunger.

The rectangular baler of any one of the previous clauses, wherein the second module comprises a distance measurement sensor configured for measuring a position on the plunger and/or a sensor for measuring an angular position of a crank arm of the plunger.

A method for determining a property of a bale that is being formed in a rectangular baler comprising a bale chamber (15) delimited by a plurality of walls (70, 80) including a movable wall section (70), an actuator (71; 71a, 71b) for exerting a pressure on the movable wall section, a plunger (18) for compressing crop material in the bale chamber (15), wherein the method comprises:

controlling the plunger to perform cyclic plunger strokes, such that in each stroke the plunger force exerted by the plunger on the crop material increases to reach a maximum plunger force (Fmax) to compress a newly inserted slice of crop material;

measuring, at consecutive moments during a plunger stroke, a plurality of first values for the plunger force exerted by the plunger and/or for the pressure (Pd) in the actuator;

determining at least one bale property characterizing the bale that is being formed in the bale chamber, in function of the plurality of first values;

wherein said plurality of first values characterize at least a phase of said plunger stroke before the plunger force reaches the maximum plunger force.

The method of clause 9, further comprising:

registering, at said consecutive moments during the plunger stroke, a plurality of second values for the position of the plunger and/or for the movement of a bale in the bale chamber and/or for the time; and wherein the determining of the at least one bale property is based on the plurality of first values and the plurality of second values.

The method of clause 9 or 10, wherein the at least one bale property comprises any one or more of the following properties: a measure for the feed rate expressing the amount of crop material that is being fed into the bale chamber during said plunger stroke, a slice thickness of a slice of crop material that is being formed during said plunger stroke.

The method of clause 11, wherein the determining comprises determining the feed rate based on first values measured during a first quarter of the plunger stroke.

The method of clause 12, wherein the determining comprises determining the feed rate based on a rate at which the first values increase.

The method of clause 11 or 12 or 13, wherein the determining comprises determining the slice thickness based on the location of a flexure point where the first values start to increase at a slower rate.

A computer program product comprising computer-executable instructions to perform one or more steps of the control method, when the program is run on a computer, of any one of the clauses 9-14.

Such a baler and determining method will allow determining in an accurate and automated manner one or more properties of the bale that is being formed in the bale chamber. This determining module and method may be combined with the control module and method that has been described above in connection with other aspects of the invention.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF THE DRAWINGS

Figure 1:
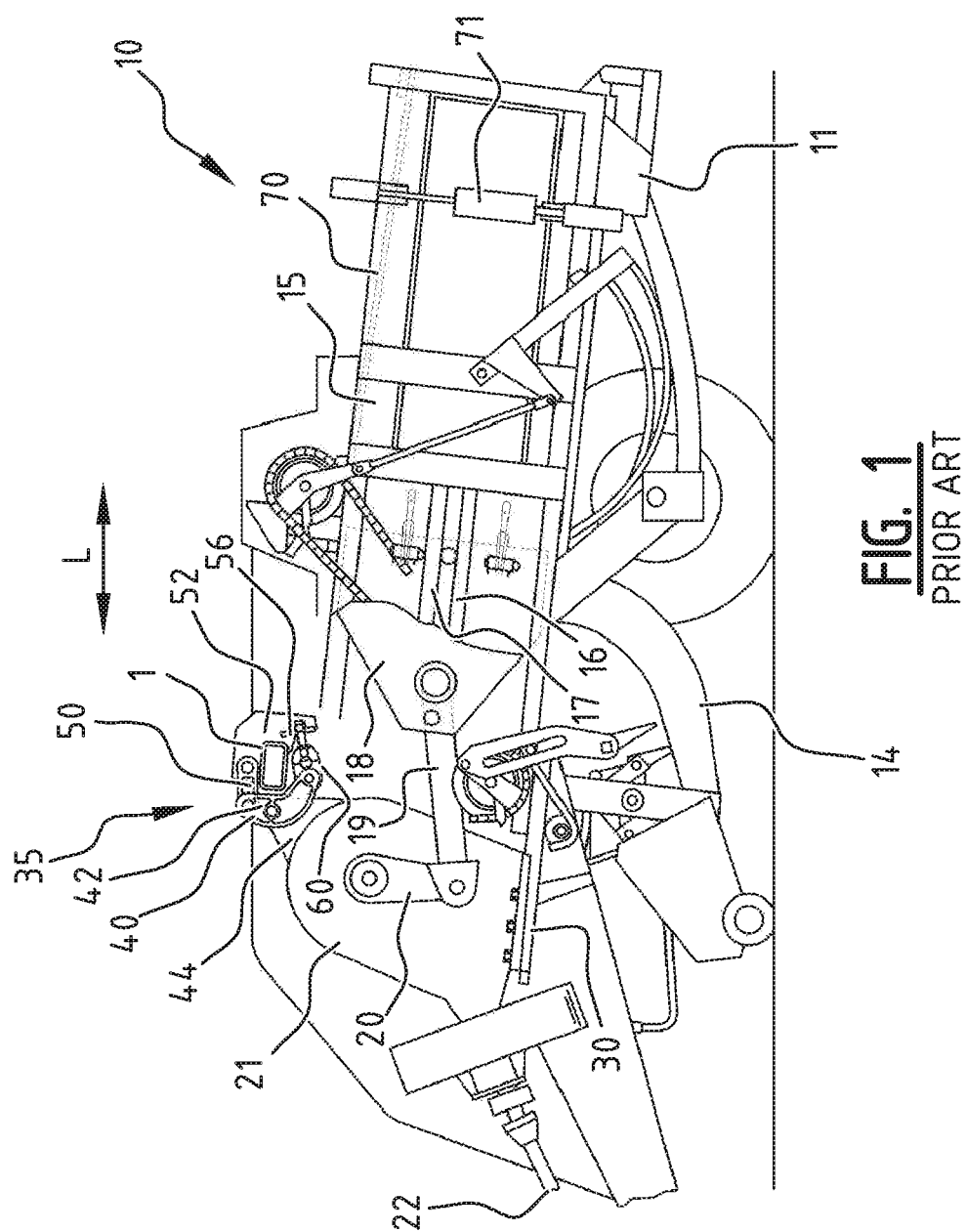
FIG. 1 is a schematic drawing of an exemplary embodiment of a rectangular baler.

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention can be used in agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Part of an agricultural baler 10 is illustrated in FIG. 1. Baler 10 has a longitudinal direction L extending in the traveling direction of the baler, and a transverse direction. Baler 10 comprises a main frame 11 onto which all parts are mounted. The baler 10 comprises a baling chamber 15. A carrying member 30 carries a lower part of a gearbox 21 of the baler 10. The top portion of the gearbox 21 is held in place by a linkage and sensor assembly 35 connecting the top portion to a cross member 1. The gearbox 21 provides actuation of the different parts of the baler 10 that need to be actuated. The gearbox 21 may be actuated by the tractor pulling the baler 10 by means of a transmission shaft 22 between the tractor and the baler 10. The gearbox 21 provides a direct actuation of a plunger 18. Hereto, the plunger 18 may for example be connected to the gearbox 21 by means of crank arms 20 and connection rods 19, also called pitman rods. The plunger 18 presses the collected crop material obtained from a feeder duct 14 against the bale that is being formed in the baling chamber 15. The plunger 18 may move on and against bottom plunger rails 16 which are provided for that purpose at both sides of the baling chamber 15, at right and left hand chamber walls. Top plunger rails 17 may optionally also be provided for forcing the movement of the plunger 18 onto the bottom plunger rails 16 and for restricting the movement of the plunger 18, thus preventing that the plunger 18 moves up and down.

During each compression stroke of plunger 18, the reaction forces of the crop material upon plunger 18 are transmitted by pitman rod 19 and crank arm 20 upon gearbox 21. Part of these forces is assumed by the attachment of the lower part of gearbox 21 to main frame 11. The remainder of the reaction forces is assumed by linkage and sensor assembly 35 at the top part of gearbox 21. Linkage and sensor assembly 35 is designed to withstand the reaction forces of plunger 18 on the body of gearbox 21. Linkage and sensor assembly 35 may comprise a lever 40 which is mounted by a transverse cylindrical pin 42 to a flat protrusion 44 on the upper housing portion of gearbox 21. Linkage and sensor assembly 35 further comprises a pull member 50 having a front end which is pivotally connected to the upper arm of lever 40. The rear end of pull member 50 is mounted between a pair of upright support plates 52 which are welded to cross member 1 of main frame 11. The support plates 52 have portions extending over and below cross member 1 and between which a transverse bracket plate 56 is welded. Transverse bracket plate 56 is facing the lower end of lever 40. A bolt extends through a hole in transverse bracket plate 56 and into the rear portion of a bearing block 60. At its front end bearing block 60 holds a bearing which is mounted between the lower ends of lever 40. A load sensor may be inserted through holes in these lower ends and through the bearing. The load sensor is operable to sense the force exerted by lever 40 on bracket plate 56. Preferably, the load sensor senses the force in a substantially longitudinal direction. Such a load sensor will allow obtaining a measure for the force exerted by plunger 18 on crop material in baling chamber 15. However, as will be explained below in addition or alternatively there may be provided other measurement modules for obtaining a measure for the force exerted by plunger 18 on crop material in baling chamber 15.

Bale chamber 15 is delimited by one or more moveable mechanical sections. In FIG. 1 a moveable top door 70 is illustrated, but there may also be provided one or two moveable side doors. The moveable top door 70 is connected to a pair of actuators 71, e.g. hydraulic cylinders, such that the top door 70 can exert a controllable pressure on crop material in bale chamber 15 in order to increase the crop density thereof.

A slice of crop material that is being inserted from feeder duct 14 at the front end of baling chamber 15 is being compressed against the crop material that is already in bale chamber 15 during an active stroke of plunger 18. Plunger 18 performs a cyclic plunger movement, i.e. plunger 18 reciprocates forward and back to compress consecutive slices of crop material against crop material that is already in bale chamber 15.

Exemplary embodiments of the present invention relate to a modification of the controlling of the baling process in bale chamber 15, and in particular to an improved control of at least one baling setting, and in particular any one or more of the following baling settings: a set stationary pressure (Ps) in the actuator, a driving speed of the baler, a setting for controlling an expansion limiting device configured for limiting the expansion of crop material in the bale chamber, such as a haydog, a clamp or star wheel.

Embodiments of the invention are based on the inventive insight that various stroke phases may be distinguished in an active stroke of plunger 18. This will be elucidated with reference to FIGS. 2A-2C.

Figure 2A:
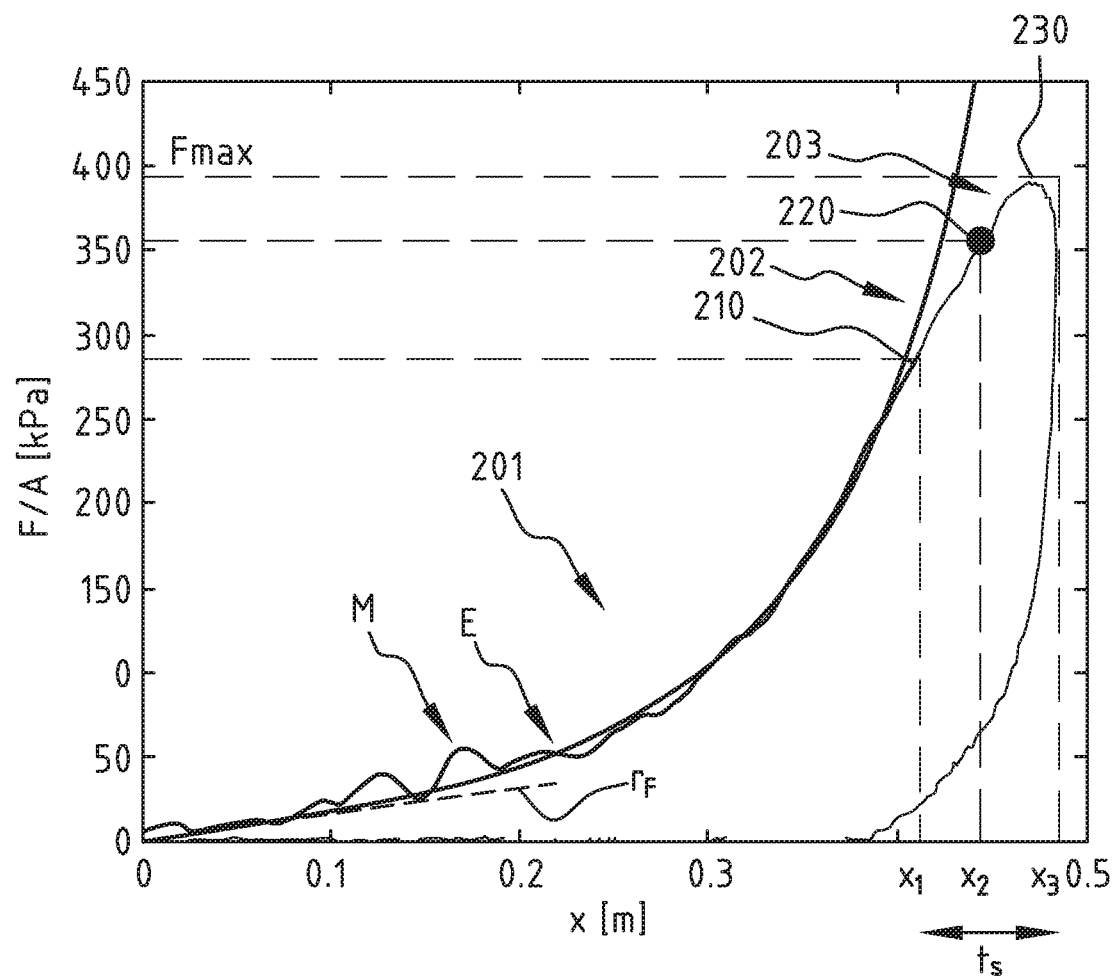
FIGS. 2A, 2B, and 2C show graphs plotting the plunger pressure (P=F/A) in function of the position of the plunger, the plunger force (F) in function of the time, and the pressure (Pd) in the actuator in function of the time, respectively.

FIG. 2A plots the plunger compression pressure $P=F/A$, i.e. the force F exerted by plunger 18 divided by the surface A, in function of the position x of plunger 18, i.e. the distance over which plunger 18 has been moved forward in bale chamber 15. In the measured curve M three phases 201, 202, 203 of the active stroke, i.e. the forward stroke of plunger 18, may be distinguished. In a first phase 201 the newly inserted crop in the bale chamber is being compressed against the already compressed and optionally partially expanded crop in the bale chamber. During this first phase 201 the plunger force F increases more or less exponentially, as indicated by curve E which is a perfect exponential curve. The moment the newly added material reaches a density similar to the density of the crop material already present in the bale chamber, the plunger starts compressing all the crop material. This is the beginning of the second phase 202. During the second phase the plunger force F still increases but at a slower rate than in the first phase 201. The transition point between the first phase 201 and the second phase 202 therefore results into a flexure point 210 ($x=x1$) in the plunger force curve M with respect to plunger position x. In a third phase 203, starting in point 220 ($x=x2$), the crop material starts moving. In this third phase 203 the plunger force F becomes higher than the friction force between the crop material and the chamber doors. The plunger force F typically still increases as all crop is typically being compressed in transverse and vertical direction through the typically tapered shape of the bale chamber. During this third phase 203 the maximum plunger force Fmax is being reached (see point 230), whilst the relative density increase is limited. Finally the plunger reaches its final dead point when $x=x3$.

The plunger load profile characterizes both the material that is being compressed and the operating conditions. Where the initial part of the plunger's load-position curve determines the material's compressibility and also relates to the amount of material inserted into the chamber (feed rate), the second part of the curve characterizes the baling process itself. This second part characterizes the balance between the friction forces, material compressibility and door positions.

In preferred embodiments of the invention the energy for the second phase 202 and partly the third phase 203 should be kept as small as possible, as this energy is used for recompressions of the crop material and for moving the bale against the friction with the doors. Moreover, in these second and third phases 202, 203, the plunger force F is directly fed through the crop material and to the bale chamber doors thereby further increasing the friction force at the moment the bale needs to start moving. In embodiments of the invention the idea is to minimize the distance between the flexure point 210 and the rear dead point of the plunger by adjusting the set stationary pressure (Ps) in the actuator. In that manner, the baling energy needed to achieve the same or similar density increase compared to prior art balers, may be significantly reduced.

Figure 2B:
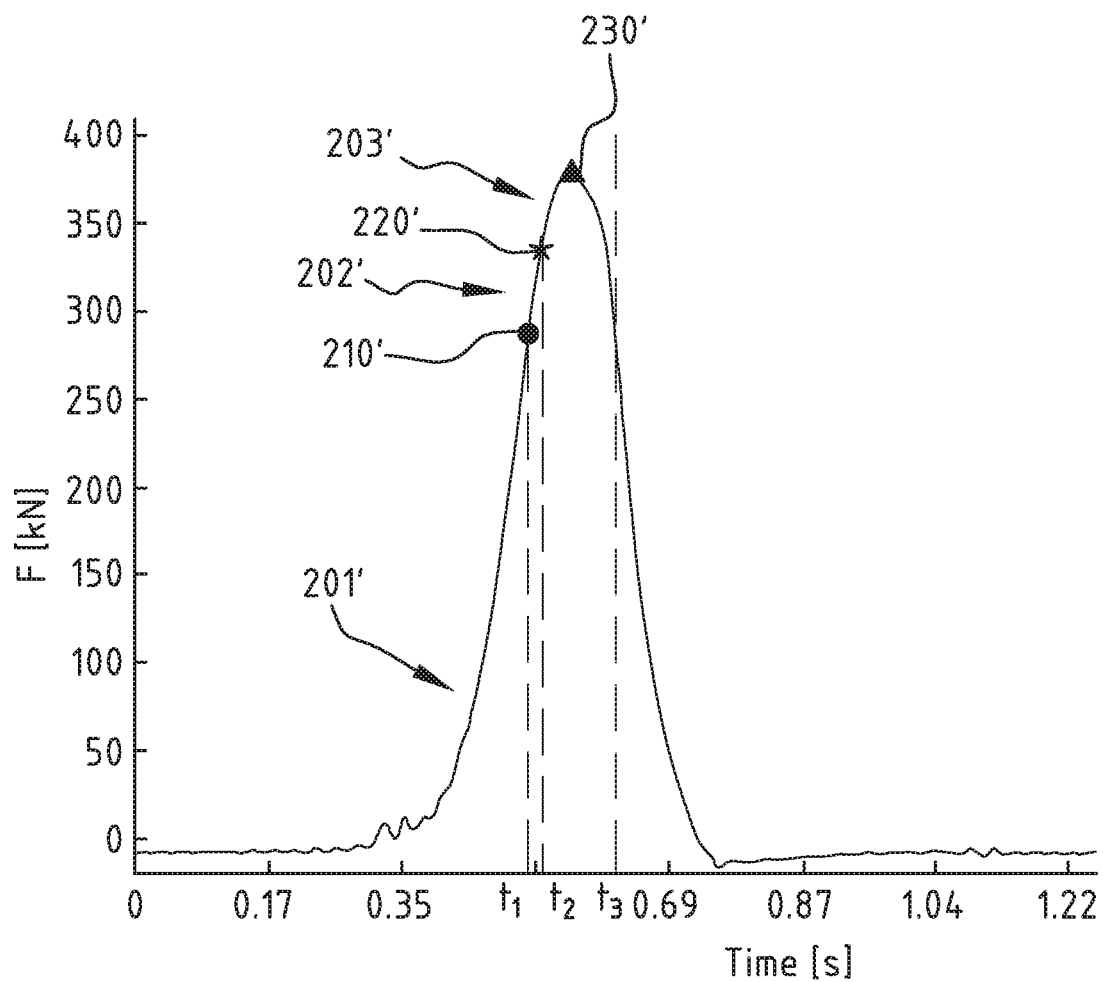

FIG. 2B plots schematically the plunger force F exerted by plunger 18, in function of the time t during a plunger stroke. In the plotted curve three phases 201', 202', 203' of the active stroke, i.e. the forward stroke of plunger 18, may be distinguished. These three phases 201', 202', 203' correspond with the above described phases 201, 202, 203 of FIG. 2A and a detailed description thereof has been omitted. Also here, there is a flexure point 210' (t=t1) between the first phase 201' and the second phase 202', a transition point 220' (t=t2) between the second phase 202' and the third phase 203', and the maximum plunger force Fmax is being reached in a point 230' in the third phase 203'. Finally the plunger reaches its final dead point when t=t3.

Figure 2C:
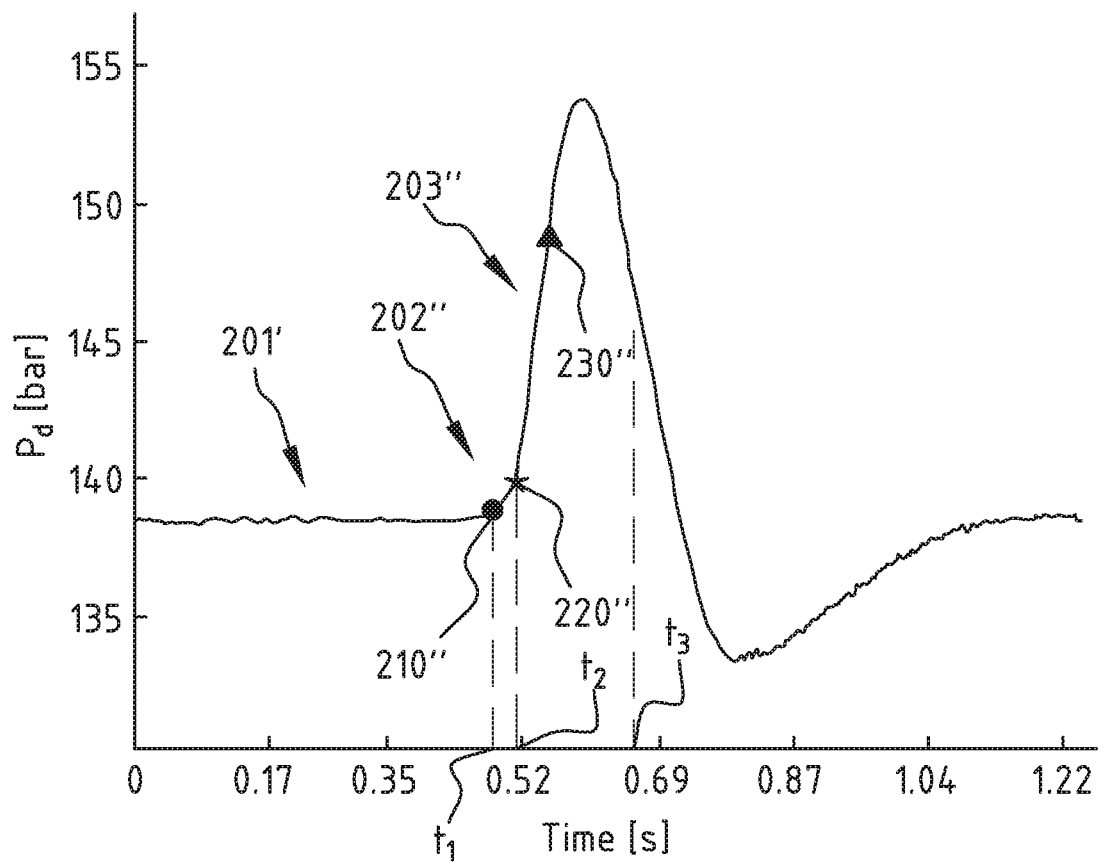

FIG. 2C plots schematically the pressure Pd in the actuator, in function of the time t, during a plunger stroke. In the plotted curve three phases 201", 202", 203" of the active stroke, i.e. the forward stroke of plunger 18, may be distinguished. These three phases 201", 202", 203" correspond with the above described phases 201, 202, 203 of FIG. 2A and a detailed description thereof has been omitted. In the first phase the pressure Pd is more or less equal to the set stationary pressure Ps set by a controller, and at the end of the stroke the pressure Pd returns to the set stationary pressure Ps. In the plotted curve there is no flexure point, but the start of the second phase 202" is characterized by a sudden increase of the pressure Pd in a point 210' (t=t1) between the first phase 201' and the second phase 202', and a transition point 220' (t=t2) between the second phase 202' and the third phase 203'. Finally the plunger reaches its final dead point when t=t3.

Other non-illustrated graphs in which one or more of the above described three phases may be distinguished are e.g. the pressure Pd in function of the position x of the plunger, the plunger force F in function of the movement of the compressed crop material in the bale chamber, the pressure Pd in function of the movement of the compressed crop material in the bale chamber. Also, the skilled person understands that instead of measuring the time itself or the position itself, a value directly correlated with the time and the position, such as e.g. the angular position of the crank arm 20 may be measured. Also, instead of measuring the pressure Pd in the actuator, other values representative for this pressure Pd, such as the force (Fd) exerted by the one or more moveable doors on the crop material, of the force exerted by the one or more actuators on the connection between the one or more actuators and the one or more doors, etc., may be measured.

Figure 3:
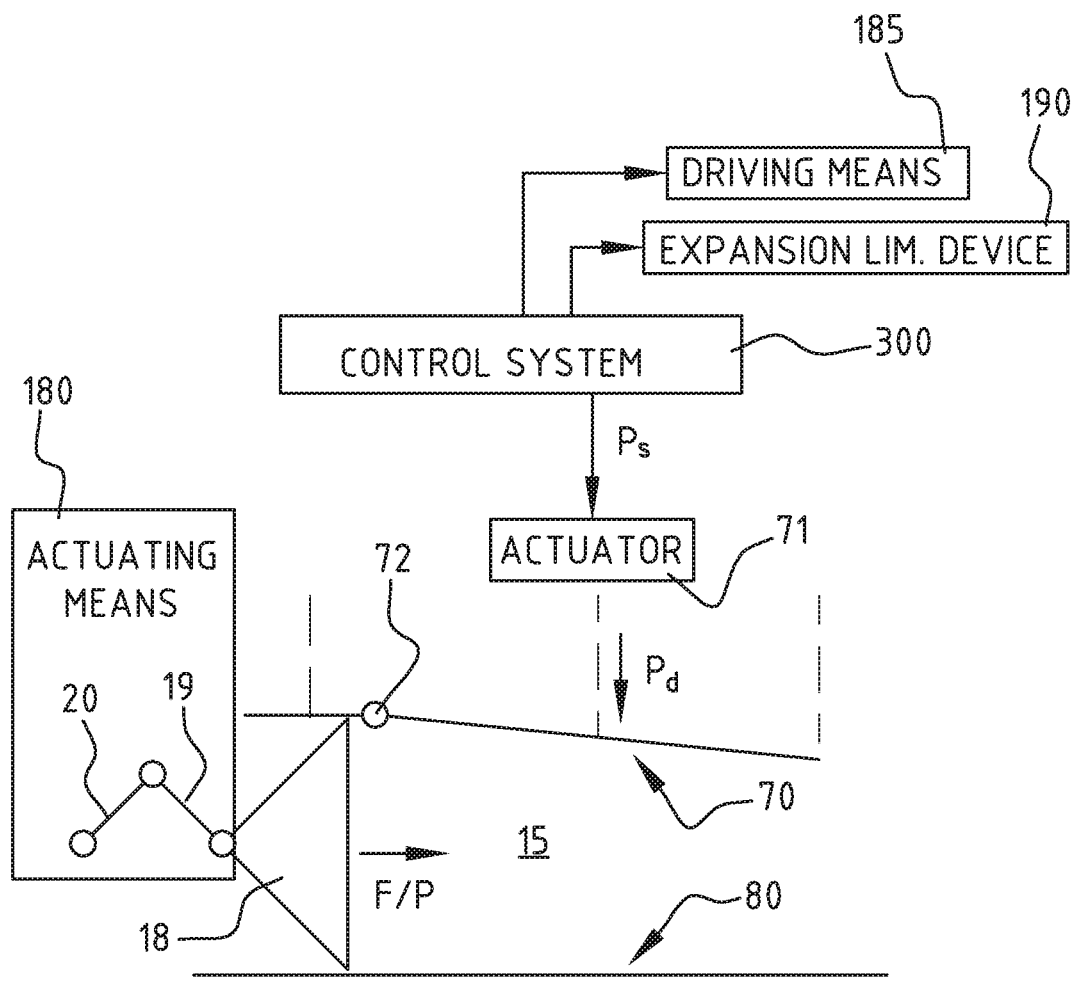
FIG. 3 is a schematic drawing of a side view of an exemplary embodiment of a rectangular baler with a control system.

FIG. 3 illustrates an exemplary embodiment of a rectangular baler with a control system 300. The baler comprises a bale chamber 15 delimited by a moveable top door 70, a bottom wall 80, and two side walls (not shown in FIG. 3). The top door 70 is connected via a hinge connection 72 to the entrance section of the bale chamber 15. The baler comprises a plunger 18 for compressing crop material in the bale chamber 15. The baler further comprises an actuator 71, typically one or more hydraulic cylinders, for exerting a pressure on the top door 70, such that the top door 70 is pressed against the crop material forming the bales in the bale chamber 15.

The control system 300 is configured to control actuating means 180 of plunger 18 to perform cyclic plunger strokes such that in each stroke the plunger force F exerted by plunger 18 on the crop material increases to reach a maximum plunger force Fmax to compress a newly inserted slice of crop material. The control system 300 is further configured to control actuator 71, and in particular to set a pressure Ps in the actuator such that energy consumed in the second phase in which the plunger has started compressing not only a newly inserted slice of crop material but also previously inserted crop material and/or in the third phase in which previously inserted crop material starts moving in the bale chamber is limited. This second and third phase may be the second phase 202, 202', 202" that has been described above in connection with FIGS. 2A, 2B, and 2C, and the third phase 203, 203', 203" that has been described above in connection with FIGS. 2A, 2B, and 2C, respectively.

In an exemplary embodiment the control system 300 is configured to control the actuator 71 to decrease the pressure on the moveable wall section 70 after the plunger has started compressing not only a newly inserted slice of crop material but also previously inserted crop material, such that the pressure on the crop material is decreased.

In addition or alternatively, other baling settings, such as the driving speed of driving means 185 of the baler and/or a setting for controlling an expansion limiting device 190 configured for limiting the expansion of crop material in the bale chamber, may be controlled by control system 300. The expansion limiting device may be e.g. a haydog, a clamp or a star wheel. In the example of a haydog, e.g. the protruding distance over which the haydog protrudes in the baling chamber 15 may be controlled. In the example of a star wheel, e.g. the braking of the star wheel may be controlled.

In an exemplary embodiment the control system 300 is configured to characterize the shape of the plunger force profile by defining characteristic points such as flexure point 210, 210' or transition point 210" and/or the start of movement 220, 220', 220". Preferably, the control system 300 will try to minimize the distance between transition point 210, 210', 210" and the rear dead point of the plunger by adjusting a baling setting, e.g. the pressure Ps set by the controller in the actuator. This implies that the total force profile is shifted towards the point in the plunger cycle where the crank 20 and the connection rods 19 are more in line, resulting in a lower required torque to drive plunger 18. In that way the recompression of expanded material will be reduced. Since typically the final bale density increases more when holding the crop than when re-compressing it, a large portion of the energy which is currently invested into re-compressing the material can be saved. Also, the energy used for moving the bale may be reduced. This will also result in an energy saving, because as soon as the bale starts moving, the amount of extra deformation is limited. Further, the peak forces can be reduced since less force is required for similar densities. In other words, by using smart characteristic points of the plunger load curve in the baler, the control system is able to adjust one or more baling settings so that a significant amount of energy may be saved whilst achieving the same or similar density increase of the crop material in the bale chamber.

In an exemplary embodiment the control system 300 may be configured to minimize the surface area under the plunger's load-position curve (FIG. 2A) or load-time curve (FIG. 2B).

Figure 4:
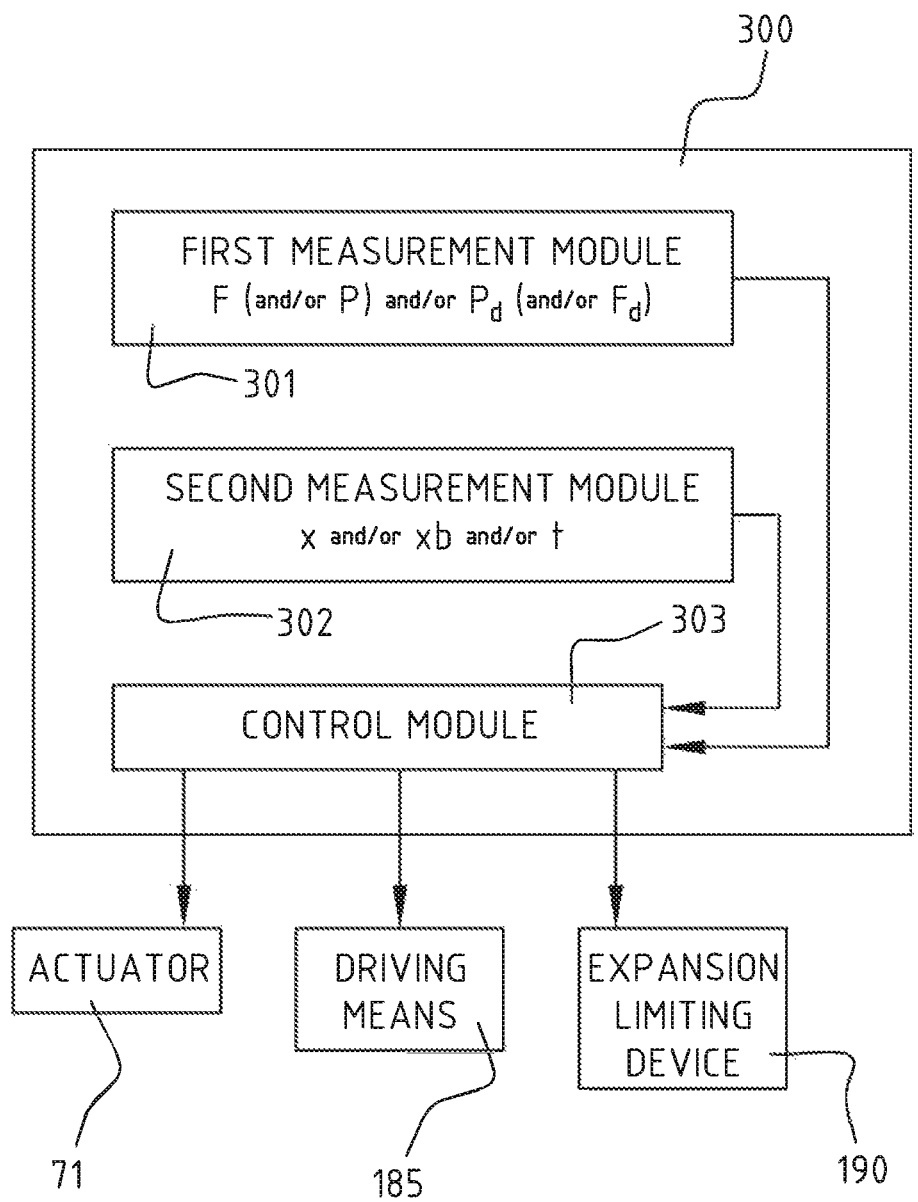
FIG. 4 is a diagram of an exemplary embodiment of a control system for a rectangular baler.

FIG. 4 illustrates a more detailed embodiment of the control system 300 of FIG. 3. The control system 300 comprises a first measurement module 301, a second measurement module 302 and a control module 303. The first measurement module 301 is configured to measure, during a plunger stroke at consecutive moments in time, a plurality of first values for the plunger force F exerted by the plunger 18 (or the pressure P) and/or for the pressure Pd in the actuator 71 (or the force Fd exerted by the moveable wall section on the crop material). The second module 302 is configured to measure, during the plunger stroke at said consecutive moments in time, a plurality of second values for the position x of the plunger and/or for the movement xb of a bale in the bale chamber and/or for the time t. The first and the second module 301, 302 may be implemented as one integrated module. The control module 303 is configured to control the actuator 71, and in particular a pressure Ps set in the actuator 71, and/or a driving means 185, and in particular a driving speed thereof, and/or an expansion limiting device 190, in function of the first and second values. More in particular the control module 303 may be configured to determine, based on the first and second values, in which phase of the three above mentioned phases 201, 202, 203 the baling process is, and may control the actuator 71 and/or the driving means 185 and/or the expansion limiting device 190. The control module 303 may be configured to control the at least one baling setting to optimize the position of the transition point 210, 210', 210" (see also FIGS. 2A-2C).

Embodiments of the control module 303 may be added to existing balers, and in particular in balers in which at least one door actuator can be controlled. Optionally, the other doors may take a different position that is determined by the force ratio between the doors and the crop material.

Figure 5:
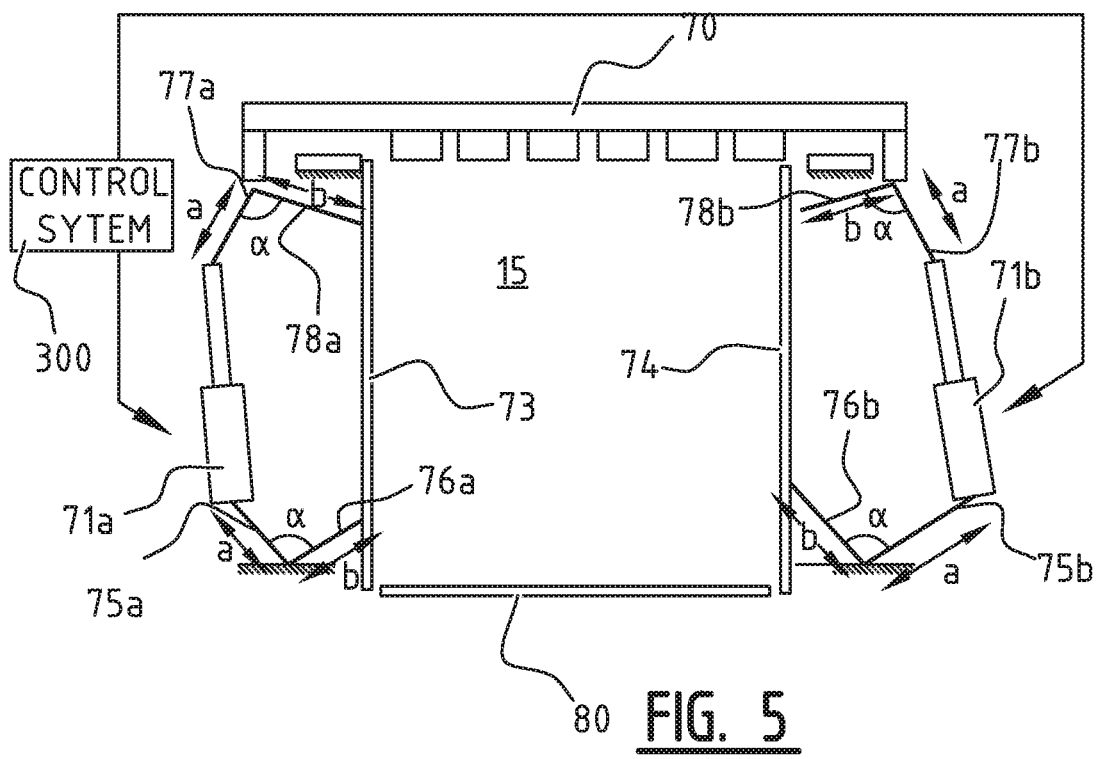
FIG. 5 is a schematic drawing of a cross section of an exemplary embodiment of a rectangular baler with a control system.

FIG. 5 illustrates a schematic cross section of a rectangular baler comprising a movable top door 70 and two movable side doors 73, 74. At each side of the bale chamber 15 there is provided a hydraulic cylinder 71a, 71b. The pressure (Ps) set by the control system 300 causes the hydraulic cylinders 71a, 71b to exert a pressure which is transferred to the doors 70, 73, 74 by means of levers 75a, 76a; 75b, 76b; 77a, 78a; 77b, 78b. A higher hydraulic pressure will cause the cylinders 71a, 71b to retract, so that the top and bottom levers tilt, thereby pushing the side doors 73, 74 further into the baling chamber 15. Simultaneously, the top door 70 is pulled down. Each of the levers 75a, 76a; 75b, 76b; 77a, 78a; 77b, 78b comprises two arms with respective arms a, b and a is the fixed angle between them.

To control hydraulic cylinders 71a, 71b there is provided a control system 300. The control system 300 is configured to control the set pressure Ps in hydraulic cylinders 71a, 71b. This controlling may be performed such that the pressure Ps is varied on a stroke per stroke basis, or after a predetermined number of strokes, or within a single stroke, or when it is determined that the baling characteristic as determined from the first and second values does not fulfill certain criteria. In an exemplary embodiment the control system 300 is configured to control the pressure Ps in hydraulic cylinders 71a, 71b to limit the energy consumed at least in a phase when the plunger is compressing not only a newly inserted slice of crop material but also a previously inserted crop material, i.e. in the second phase 202, 202', 202" that has been described above in connection with FIGS. 2A, 2B, and 2C, and/or in a phase when the previously inserted crop material starts moving in the bale chamber, i.e. in the third phase 203, 203', 203" that has been described above in connection with FIGS. 2A, 2B, and 2C. In an exemplary embodiment the control system 300 may be implemented as described above in FIG. 4, wherein the control module 303 controls the two hydraulic cylinders 71a, 71b instead of actuator 71.

The person skilled in the art will understand that there may also be provided separate independent actuators to control the movement of the side doors 73, 74 and of the top door 70. Also in such embodiments a control system 300 may be used.

Figure 6:
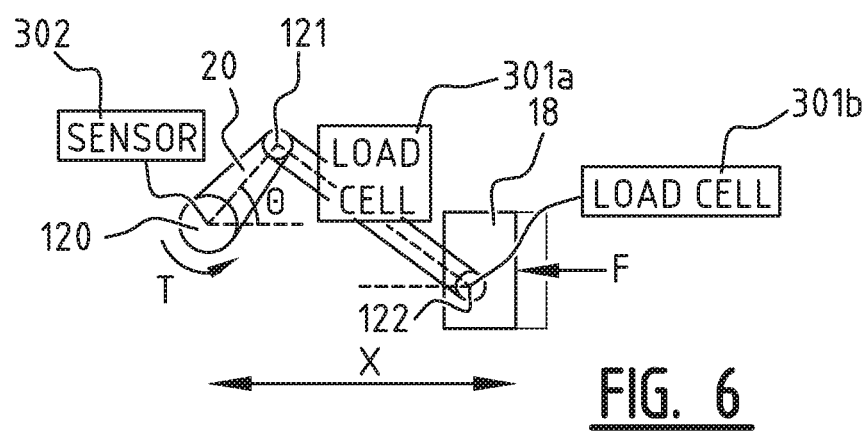
FIG. 6 is a schematic drawing of an exemplary embodiment of an assembly used for reciprocating the plunger illustrating possible positions for a measurement module for measuring the plunger force (F)

FIG. 6 illustrates an exemplary embodiment of the actuating means of a plunger 18 with associated measurement module. As explained in connection with FIG. 1 plunger 18 may for example be connected to a gearbox by means of a crank arm 20 and a connection rod 19, also called a pitman rod. Crank arm 20 has a first end which is pivotally connected around pivot point 120 to the gearbox, and a second end which is pivotally connected to a first end of the connection rod 19 in pivot point 121. The other end of connection rod 19 is pivotally connected around pivot point 122 to plunger 18. During each compression stroke of plunger 18, the reaction forces of the crop material upon plunger 18 are transmitted by pitman rod 19 and crank arm 20 to the gearbox. Part of these forces may be assumed by the attachment of the lower part of gearbox to the main frame. Another part of the reaction forces may be assumed by a linkage assembly at the top part of gearbox. As explained in connection with FIG. 1 a load sensor may be integrated in linkage and sensor assembly 35 to obtain a measure for the force exerted by plunger 18 on crop material in the baling chamber. However, in addition or alternatively there may be provided a load cell 301a for measuring the load on the connection rod 19 and/or there may be provided a load cell 301b in pivot point 122, in order to obtain a measure for the force exerted by plunger 18 on crop material in baling chamber 15. In yet other non-illustrated embodiments, in addition or alternatively, there may be measured a deformation of a portion of the frame, a bending of the bottom, a velocity variation of a flywheel of a transmission configured to transmit power from a baler input shaft to an input shaft of actuating means for driving the plunger 18.

FIG. 6 further illustrates an exemplary embodiment of a second measurement module configured for measuring the position of the plunger 18 during an active stroke. In this embodiment a sensor 302 is provided for measuring the angular position of the crank arm 20. The sensor 302 may be e.g. a proximity sensor. From this angular position the position x of the plunger 18 can be determined.

Other non-illustrated embodiments of a second measurement module configured for measuring the position of the plunger 18 during an active stroke, comprise any one or more of the following: a linear sensor on the plunger 18, a sensor for measuring knotting pulses of a knotting system of the baler, a sensor for measuring a position of a crank gear for driving crank arm 20, etc.

Figure 7:
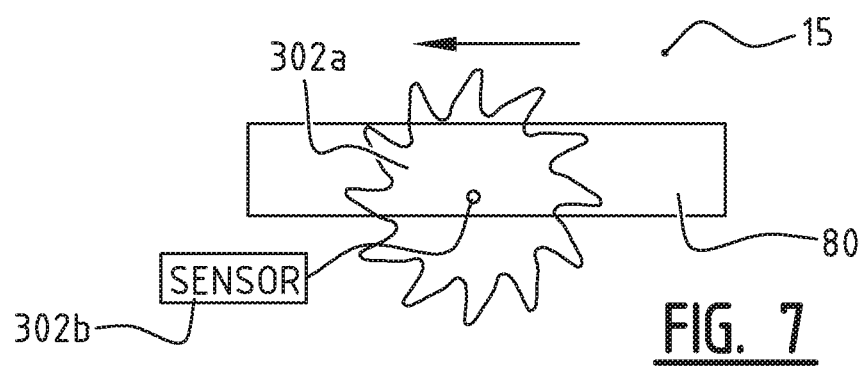
FIG. 7 is a schematic drawing of an exemplary embodiment of a measurement module for measuring the movement of the bale in the bale chamber.

FIG. 7 illustrates another exemplary embodiment of a second measurement module configured for measuring bale movement xb. In order to measure the movement of a bale in bale chamber 15 at the end of an active stroke of plunger 18, there may be provided a wheel 302a in combination with a rotation sensor 302b for measuring in the rotation of the wheel 302a. In that way there can be obtained a measure for the bale movement xb.

A person skilled in the art realizes that in embodiments of the invention mainly the control system for controlling the baling in the bale chamber is modified based on new insights about characteristics of the plunger load curve, in order to bale more efficiently. Embodiments of the invention may be implemented in existing balers using existing measurement modules. However, optionally a plunger load measurement module may be improved by relocating and or adding a load cell for measuring the plunger force and/or by directly measuring the connection rod forces. Also a measurement module for performing a position measurement plunger and/or an estimation of the plunger movement may be added.

Figure 8:
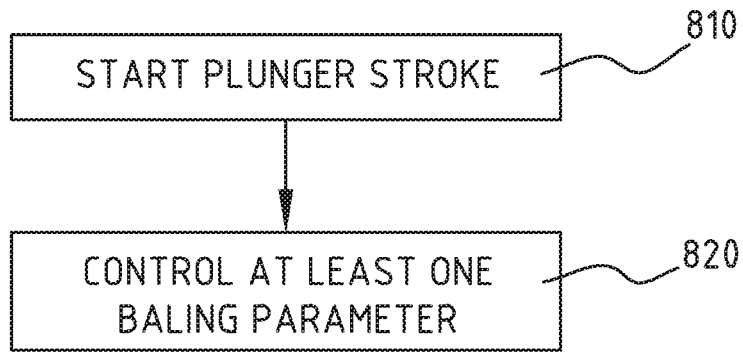
FIGS. 8 and 9 are flow charts illustrating exemplary embodiments of a control method.

FIG. 8 illustrates an exemplary embodiment of a control method for controlling the compressing of crop material in a rectangular baler comprising a bale chamber delimited by a plurality of walls including one ore more movable wall sections, one or more actuators for exerting a pressure on the one or more movable wall section, and a plunger for compressing crop material in the bale chamber. The control method comprises controlling the plunger to perform cyclic plunger strokes, such that in each stroke the plunger force (F) exerted by the plunger on the crop material increases to reach a maximum plunger force (Fmax) to compress a newly inserted slice of crop material. Step 810 illustrates the start of a plunger stroke. During the plunger stroke, and, as illustrated in step 802, at least one baling setting influencing the compressing of the crop material in the bale chamber is controlled in function of first and second values, see further. The controlling of the one or more baling settings is preferably done such that at least in a phase when the plunger is compressing not only a newly inserted slice of crop material but also a previously inserted crop material and/or in a phase when the previously inserted crop material starts moving in the bale chamber, the consumed energy is limited. More in particular the controlling step 820 may comprises controlling one or more actuators to decrease the pressure (Ps) after the plunger has started compressing not only a newly inserted slice of crop material but also previously inserted crop material.

Figure 9:
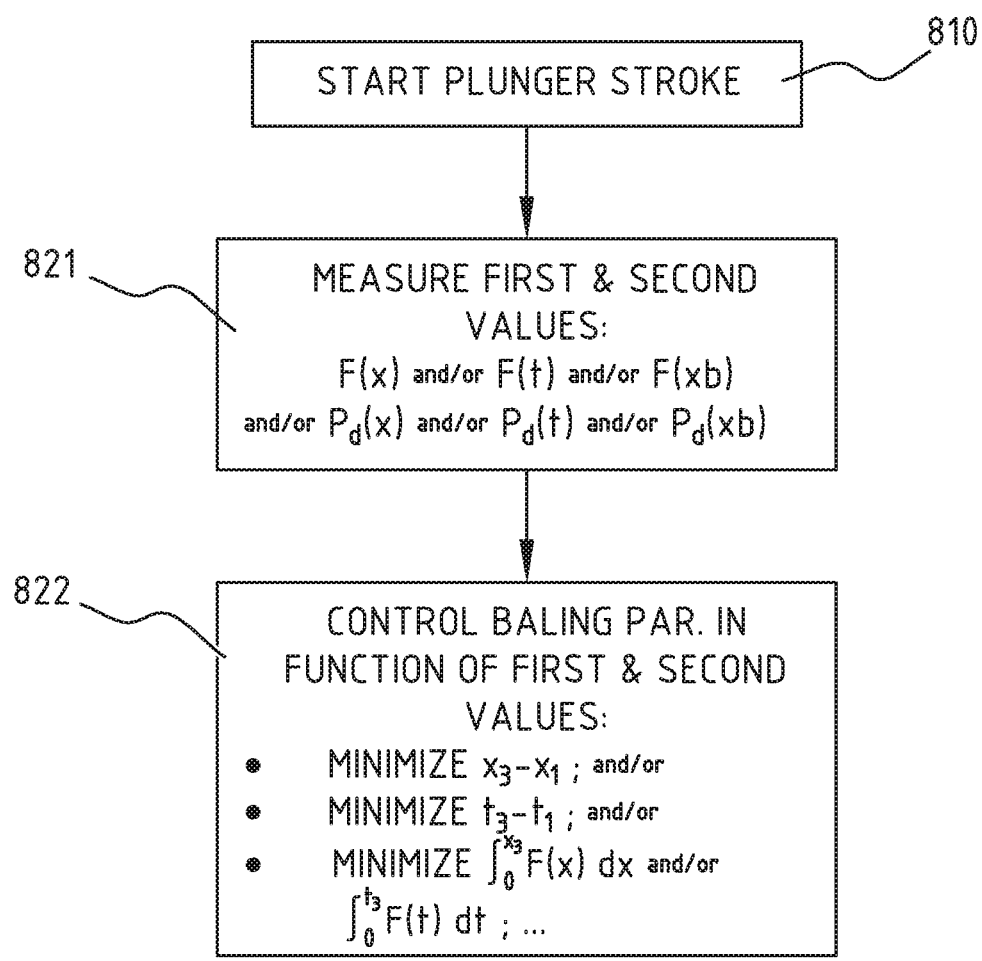

FIG. 9 illustrates a further developed exemplary embodiment of the control method of FIG. 8. In the embodiment of FIG. 9 the controlling comprises a first step 821 comprising measuring, at consecutive moments during a plunger stroke, a plurality of first values representative for the plunger force (F) exerted by the plunger or for the pressure (Pd) in the one or more actuators; and registering, at said consecutive moments during the plunger stroke, a plurality of second values for the position (x) of the plunger and/or for the movement (xb) of a bale in the bale chamber and/or for the time (t), such that any one or more of the following is obtained: F(x), F(t), F(xb), Fd(x), Fd(t), Fd(xb). In a second step 822 at least one baling setting, e.g. the stationary pressure Ps set by a controller in the actuator, is controlled in function of the first and second values. More in particular the pressure Ps may be controlled in order to minimize the length of the second and third phase, i.e. minimize (x3–x1) or (t3–t1), see also FIGS. 2A-2C. In an alterative embodiment the controlling of the one or more baling settings comprises the controlling of those one or more settings such that a measure for the surface area below a curve obtained when plotting the plurality of first values in function of the second values, is limited. In other words $\int_0^{x3} F(x) \cdot dx$ or $\int_0^{t3} F(t) \cdot dt$ it may be limited by controlling e.g. The pressure in the actuator in the second and/or third phase.

The skilled person understands that in embodiments of the invention the first and second values may be determined for one or more strokes with a certain type of crop material, whereupon suitable values for the one or more baling settings may be determined for that crop material. Those values may then be used for the following strokes of the baling process without having to determine again the first and second values. However, in other embodiments, the control system may be a closed-loop control system periodically adapting the one or more baling settings in function of the measured first and second values.

In an exemplary embodiment of the invention the expansion of the already compressed crop in the bale chamber may be further prevented using an expansion limiting device, e.g. Clamps or hay dogs, as is known by the person skilled in the art. Moving the flexure point 210, 210' towards the rear dead point of the plunger can also be achieved by holding the compressed crop instead of letting it re-expand after every plunger stroke. This saves on energy for re-compressing the expanded material and can be realized by adding hay dogs. In such an embodiment, flexure point 210, 210' will more or less correspond with transition point 220, 220', and the detection of the movement of the bale (xb) can be used as a trigger to decrease the pressure exerted by the top door on the crop material.

Figure 10:
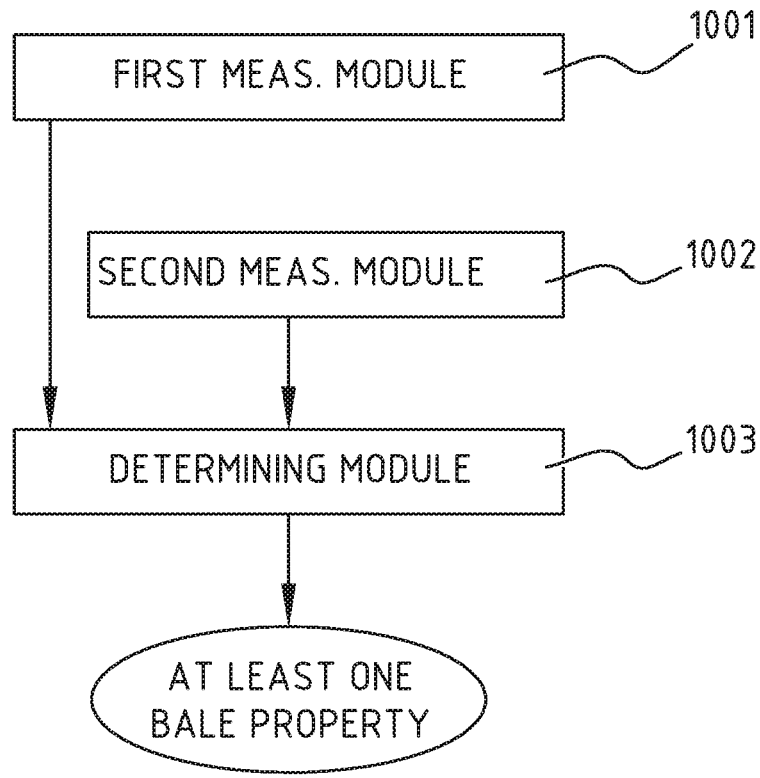
FIG. 10 is a schematic drawing of a cross section of an exemplary embodiment of a rectangular baler with a determining module.

FIG. 10 illustrates an exemplary embodiment of a system of a rectangular baler for determining at least one bale property of a bale that is being formed in the bale chamber of the baler. The baler may have e.g. The features that have been described in connection with FIGS. 1 and 3. The system comprises a first module 1001 configured to measure, during a plunger stroke at consecutive moments in time, a plurality of first values for the pressure (Pd) in the actuator and/or for the plunger force (F) exerted by the plunger; and a second module 1002 configured to measure, during the plunger stroke at said consecutive moments in time, a plurality of second values for the position of the plunger and/or for the movement of a bale in the bale chamber and/or for the time. The first module and the second module may be the same as the first and second module of the control system that has been described above in connection with previous embodiments. Further there is provided a determining module 1003 configured to determine at least one bale property characterizing the bale that is being formed in the bale chamber in function of the plurality of first values and the plurality of second values. The at least one bale property comprises any one or more of the following properties: a measure $r_F$ for the feed rate expressing the amount of crop material that is being fed into the bale chamber during said plunger stroke, a slice thickness $t_S$ of a slice of crop material that is being formed during said plunger stroke.

The determining module 1003 may be configured to determine a measure $r_F$ for the feed rate based on the first values measured during a first quarter of the plunger stroke. This is illustrated in FIG. 2A where the measure $r_F$ is determined as a rate at which the first values increase in function of the second values at the beginning of a stroke.

The determining module 1003 may be configured to determine the slice thickness $t_S$ based on the location of the flexure point 210 where the first values start to increase at a slower rate in function of the second values, see FIG. 2A. The slice thickness $t_S$ can be calculated as (x3–x1).

Figure 11:
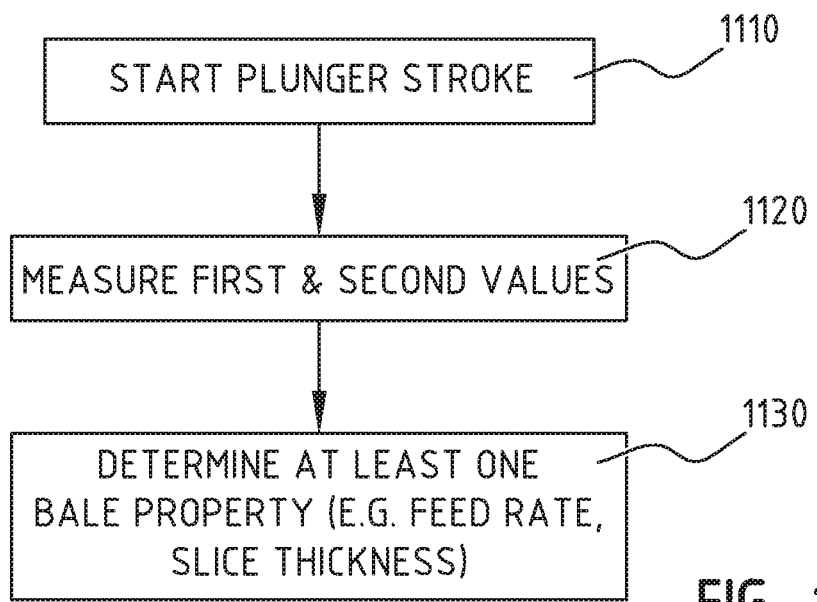
FIG. 11 is a flow chart illustrating an exemplary embodiment of a determining method.

FIG. 11 illustrates an exemplary embodiment of a method for determining a property of a bale that is being formed in a rectangular baler, e.g. The baler of FIG. 1 and FIG. 3. The method comprises controlling the plunger to perform cyclic plunger strokes, such that in each stroke the plunger force exerted by the plunger on the crop material increases to reach a maximum plunger force (Fmax) to compress a newly inserted slice of crop material. In a first step 1110 a plunger stroke is started. In a second step 1120, at consecutive moments during the plunger stroke, a plurality of first values for the plunger force exerted by the plunger and/or for the pressure exerted by the actuator, and a plurality of second values for the position of the plunger and/or for the movement of a bale in the bale chamber and/or for the time, are measured. In a third step 1130 at least one bale property characterizing the bale that is being formed in the bale chamber, is determined in function of the plurality of first and second values, wherein said plurality of first values characterize at least a phase of said plunger stroke before the force reaches the maximum plunger force. The at least one bale property comprises any one or more of the following properties: a measure $r_F$ for the feed rate expressing the amount of crop material that is being fed into the bale chamber during said plunger stroke, a slice thickness $t_S$ of a slice of crop material that is being formed during said plunger stroke.

The determining step 1130 may comprise determining the feed rate based on first values measured during a first quarter of the plunger stroke. This is illustrated in FIG. 2A where a measure $r_F$ for the feed rate is determined as a rate at which the first values increase in function of the second values at the beginning of a stroke. In addition or alternatively, the determining step 1130 may comprise determining the slice thickness $t_S$ based on the location of the flexure point 210 where the first values start to increase at a slower rate in function of the second values, see FIG. 2A. The slice thickness $t_S$ can be calculated as (x3−x1).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, hard drives, optically readable digital data storage media, etc.

In yet other exemplary embodiments, the movable section may comprise a first section and a second section, seen in a longitudinal direction of the baler, wherein, a first end of said first section is hingedly connected to a frame of the baler at a plunger end of the bale chamber, and a second end of said first section is hingedly connected to the second section, such that the movable section can have a slope discontinuity where the first section is connected to the second section. Also in such embodiments the pressure exerted on the first and second section may be controlled by a control system as described above.

The functions of the various elements shown in the FIGS., including any functional blocks labelled as "modules", may be provided through the use of dedicated hardware, such as measurement devices, controllers, etc., as well as hardware capable of executing software in association with appropriate software.

It should be appreciated by those skilled in the art that any block diagrams herein represent conceptual views of illustrative embodiments. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A control system for a rectangular baler comprising a bale chamber delimited by a plurality of walls including a movable wall section, at least one actuator connected to and configured for exerting a pressure on the movable wall section, a plunger for compressing crop material in the bale chamber, the crop material comprising a newly inserted slice of crop material and a previously inserted slice of crop material, the control system for controlling the plunger to perform cyclic plunger strokes such that in each stroke a plunger force exerted by the plunger on the crop material increases to compress the crop material, the control system comprising:
    a first module configured to measure, during a plunger stroke at consecutive moments in time, a plurality of first values for at least one of pressure in the at least one actuator and the plunger force exerted by the plunger, the first module further configured to measure the plurality of first values during a portion of a plunger stroke cycle before the plunger force reaches a maximum during the plunger stroke cycle; and
    a controller configured to control at least one baling setting influencing compression of the crop material in the bale chamber as a function of the plurality of first values, the at least one baling setting comprising a set stationary pressure in the at least one actuator, the controller further configured to control the at least one baling setting to reduce energy consumed during a portion of the plunger stroke cycle in which the plunger has started compressing the crop material and in which the crop material starts moving in the bale chamber, the set stationary pressure in the at least one actuator being constant during a least a portion of time while the plunger is moving.

2. The control system of claim 1, further comprising a second module configured to measure, at the consecutive moments in time, a plurality of second values for at least one of: the position of the plunger, the movement of a bale in the bale chamber, and the time; wherein the controller is further configured to control the at least one baling setting influencing the compression of the crop material in the bale chamber as a function of the plurality of second values.

3. The control system of claim 1, wherein the at least one baling setting further comprises any one or more of the following settings: a driving speed of the baler, and a setting for controlling an expansion limiting device configured for limiting the expansion of crop material in the bale chamber.

4. The control system of claim 2, wherein the controller is further configured to control, based on the plurality of first values and the plurality of second values, the at least one baling setting such that energy consumed in a phase of the plunger stroke cycle in which the plunger has started compressing at least one of the newly inserted slice of crop material and the previously inserted slice of crop material and in a phase of the plunger stroke cycle in which the previously inserted crop material starts moving in the bale chamber is limited.

5. The control system of claim 2, wherein the controller is further configured to control the at least one baling setting such that the pressure in the at least one actuator in a position where the first values start to increase at a slower rate as a function of the second values, are controlled.

6. The control system of claim 1, wherein the controller is further configured to control the at least one actuator within a single plunger stroke of the cyclic plunger strokes.

7. The control system of claim 1, wherein the first module comprises a load measurement cell configured for measuring a load on the plunger.

8. The control system of claim 1, wherein the second module comprises a distance measurement sensor configured for measuring at least one of a position of the plunger and a sensor for measuring an angular position of a crank arm of the plunger.

9. A control method for controlling compressing of crop material in a rectangular baler comprising a bale chamber delimited by a plurality of walls including a movable wall section, at least one actuator connected to and configured for exerting a pressure on the movable wall section, and a plunger for compressing crop material in the bale chamber, the method comprising:
- controlling the plunger to perform cyclic plunger strokes, such that in each stroke the plunger force exerted by the plunger on the crop material increases to compress the crop material;
- measuring, at consecutive moments during a plunger stroke, a plurality of first values for at least one of the plunger force exerted by the plunger and the pressure in the at least one actuator, the measuring performed during a portion of a plunger stroke cycle before the plunger force reaches a maximum during the plunger stroke cycle; and
- controlling at least one baling setting influencing compression of the crop material in the bale chamber as a function of the plurality of first values, the at least one baling setting comprising a set stationary pressure in the at least one actuator, the controlling further comprising controlling the at least one baling setting to reduce energy consumed during a portion of the plunger stroke cycle in which the plunger has started compressing a newly inserted slice of material and previously inserted crop material and in which the crop material starts moving in the bale chamber, the set stationary pressure in the at least one actuator being constant during a least a portion of time while the plunger is moving.

10. The control method of claim 9, further comprising:
- registering, at the consecutive moments during the plunger stroke, a plurality of second values for at least one of the position of the plunger and for the movement of a bale in the bale chamber and time,
- wherein the controlling of the at least one baling setting is based on the plurality of first values and the plurality of second values.

11. The control method of claim 9, wherein the at least one baling setting comprises any one or more of the following settings: a driving speed of the baler, and a setting for controlling an expansion limiting device configured for limiting the expansion of crop material in the bale chamber.

12. The control method of claim 10, wherein the controlling of the at least one baling setting, based on the plurality of first values and the plurality of second values, further comprises controlling the at least one baling setting such that energy consumed in a first phase of the plunger stroke cycle when the plunger is compressing at least one of the newly inserted slice of crop material and the previously inserted slice of crop material and a second phase of the plunger stroke cycle when the previously inserted crop material starts moving in the bale chamber, is limited.

13. The control method of claim 9, wherein the controlling of the at least one baling setting further comprises controlling the at least one baling setting such that the pressure in the actuator in a position where the rate in increase of the first values, as a function of the second values, starts to slow, is controlled.

14. The control method of claim 10, wherein the controlling of the at least one baling setting based on the plurality of first values and the plurality of second values, further comprises controlling the at least one baling setting such that a measure for a surface area below a curve obtained when plotting the plurality of first values as a function of the plurality of second values, is limited.

15. The control system of claim 1, wherein the controller is configured to control at least one baling setting influencing the compression of the crop material in the bale chamber as a function of a load profile based on the plurality of first values; the load profile comprising a first phase in which the newly inserted crop in the bale chamber is being compressed against the already compressed material and a second phase in which the plunger starts compressing all the crop material and the plunger force F still increases but at a slower rate than in the first phase.

16. The control method of claim 9, wherein the at least one baling setting influencing the compression of the crop material in the bale chamber is controlled as a function of a load profile based on the plurality of first values; the load profile comprising a first phase in which the newly inserted crop in the bale chamber is being compressed against the already compressed and a second phase in which the plunger starts compressing all the crop material and in which the plunger force F still increases but at a slower rate than in the first phase.

17. A computer program product comprising computer-executable instructions to perform the controlling steps of the control method of claim 9, when the program is run on a computer.

18. The control system of claim 1, wherein the first module is configured to measure, during the plunger stroke at the consecutive moments in time, the plurality of first values for the pressure in the at least one actuator and the plunger force exerted by the plunger.

19. The control method of claim 9, wherein the measuring comprises measuring, at the consecutive moments during the plunger stroke, the plurality of first values for the plunger force exerted by the plunger and the pressure in the at least one actuator.

20. A control system for a rectangular baler comprising a bale chamber delimited by a plurality of walls including a movable wall section, at least one actuator connected to and configured for exerting a pressure on the movable wall section, a plunger for compressing crop material in the bale chamber, the crop material comprising a newly inserted slice of crop material and a previously inserted slice of crop material, the control system for controlling the plunger to perform cyclic plunger strokes such that in each stroke a plunger force exerted by the plunger on the crop material increases to compress the crop material, the control system comprising:
- a first module configured to measure, during a plunger stroke at consecutive moments in time, a plurality of first values for at least one of pressure in the at least one actuator and the plunger force exerted by the plunger, the first module further configured to measure the plurality of first values during a portion of a plunger stroke cycle before the plunger force reaches a maximum during the plunger stroke cycle;
- a second module configured to measure, at the consecutive moments in time, a plurality of second values for at least one of: the position of the plunger, the movement of a bale in the bale chamber, and the time; and
- a controller configured to control at least one baling setting influencing compression of the crop material in the bale chamber as a function of the plurality of first values and the plurality of second values, the at least one baling setting comprising the pressure in the at least one actuator, the controller further configured to control the at least one baling setting such that the pressure in the at least one actuator in a position where the first values start to increase at a slower rate as a function of the second values, are controlled.

* * * * *